United States Patent
DeLaVergne

(10) Patent No.: US 9,878,824 B1
(45) Date of Patent: Jan. 30, 2018

(54) REUSABLE ENVELOPES

(75) Inventor: Carol A. DeLaVergne, Stillwater, MN (US)

(73) Assignee: ECOENVELOPES, LLC, Saint Paul, MN (US)

( * ) Notice: Subject to any disclaimer, the term of this patent is extended or adjusted under 35 U.S.C. 154(b) by 889 days.

(21) Appl. No.: 13/488,928

(22) Filed: Jun. 5, 2012

Related U.S. Application Data

(63) Continuation of application No. 11/893,562, filed on Aug. 16, 2007, now Pat. No. 8,191,763.

(51) Int. Cl.
  *B65D 27/06* (2006.01)
  *B65D 27/32* (2006.01)
  *B65D 27/34* (2006.01)

(52) U.S. Cl.
  CPC .................. *B65D 27/06* (2013.01)

(58) Field of Classification Search
  CPC ..... B65D 27/06; B65D 27/34; Y02W 30/807; B42D 5/026; B42D 15/08
  USPC ................................................ 229/300–315
  See application file for complete search history.

(56) References Cited

U.S. PATENT DOCUMENTS

| | | | | |
|---|---|---|---|---|
| 1,438,122 A | * | 12/1922 | McCoy | 229/303 |
| 1,953,192 A | * | 4/1934 | Rossiter | 229/302 |
| 1,957,704 A | * | 5/1934 | Drachman | 229/305 |
| 1,960,054 A | * | 5/1934 | Johnson | 229/92.3 |
| 1,988,908 A | * | 1/1935 | MacKinnon | 229/71 |
| 2,129,705 A | * | 9/1938 | Reineman | 229/81 |
| 2,201,538 A | * | 5/1940 | Holden | 229/306 |
| 2,310,371 A | * | 2/1943 | Lines et al. | 206/455 |
| 2,340,700 A | * | 2/1944 | Sawdon | 229/306 |
| 2,350,100 A | * | 5/1944 | Deutschmeister et al. | 229/303 |
| 2,363,957 A | * | 11/1944 | Goff | 229/313 |
| 2,400,406 A | * | 5/1946 | Godoy | 229/79 |
| 2,417,982 A | * | 3/1947 | Histed | 229/92.8 |
| 2,835,512 A | * | 5/1958 | Whitman | 462/64 |
| 2,928,583 A | * | 3/1960 | Law | 229/305 |
| 2,941,711 A | * | 6/1960 | Biek | 229/303 |
| 2,954,154 A | * | 9/1960 | Mooney | 229/70 |
| 3,062,431 A | * | 11/1962 | Rabenold | 229/303 |
| 3,086,695 A | * | 4/1963 | Lillibridge | 229/303 |
| 3,111,257 A | * | 11/1963 | Peach | 229/302 |
| 3,113,716 A | * | 12/1963 | Howard | 229/304 |
| 3,152,751 A | * | 10/1964 | Hiersteiner | 229/303 |
| 3,184,150 A | * | 5/1965 | Hubbard | 229/305 |
| 3,227,360 A | * | 1/1966 | Krueger | 229/303 |
| 3,259,304 A | * | 7/1966 | Tichnor | 229/92.8 |
| 3,261,623 A | * | 7/1966 | Kiedrowski | 229/69 |
| 3,276,669 A | * | 10/1966 | Vilutis | 383/204 |
| 3,330,581 A | * | 7/1967 | Ivarsson-Wallerstrom | 462/21 |
| 3,374,940 A | * | 3/1968 | Allison | 229/70 |
| 3,380,648 A | * | 4/1968 | De Lyra | 229/71 |
| 3,411,699 A | * | 11/1968 | Pine et al. | 229/69 |
| 3,426,961 A | * | 2/1969 | Allison | 229/70 |
| 3,498,528 A | * | 3/1970 | Klein | 229/302 |
| 3,525,469 A | * | 8/1970 | Sawdon | 229/305 |
| 3,531,046 A | * | 9/1970 | Carrigan | 229/72 |
| 3,537,637 A | * | 11/1970 | Hiersteiner | 229/70 |
| 3,545,669 A | * | 12/1970 | Kinkade et al. | 229/300 |

(Continued)

*Primary Examiner* — Peter Helvey
(74) *Attorney, Agent, or Firm* — Albert W. Watkins

(57) ABSTRACT

The present invention provides reusable envelope structures and methods of use thereof. In preferred aspects, the present invention provides envelope structures in which a single envelope structure can provide multiple uses.

5 Claims, 13 Drawing Sheets

(56) References Cited

U.S. PATENT DOCUMENTS

| | | | | |
|---|---|---|---|---|
| 3,652,007 A * | 3/1972 | MacDougall | | 229/304 |
| 3,693,869 A * | 9/1972 | Eaves, Jr. | | 229/302 |
| 3,718,277 A * | 2/1973 | Volkert | | 229/301 |
| 3,747,837 A * | 7/1973 | Wilson | | 229/303 |
| 3,802,618 A * | 4/1974 | Wiessner | | 229/304 |
| 3,822,492 A * | 7/1974 | Crawley | | 40/638 |
| 3,874,582 A * | 4/1975 | Wang | | 229/303 |
| 3,910,410 A * | 10/1975 | Shaw | | 220/359.3 |
| 3,941,309 A * | 3/1976 | Gendron | | 229/301 |
| 3,979,051 A * | 9/1976 | Close | | 229/72 |
| 3,982,689 A * | 9/1976 | Retrum | | 229/71 |
| 4,157,759 A * | 6/1979 | Dicker | | 229/301 |
| 4,159,129 A * | 6/1979 | Lockhart | | 462/67 |
| 4,180,168 A * | 12/1979 | Hiersteiner | | 229/302 |
| 4,190,161 A * | 2/1980 | Gendron | | 229/313 |
| 4,190,162 A * | 2/1980 | Buescher | | 229/314 |
| 4,194,631 A * | 3/1980 | Rangan | | 229/302 |
| 4,245,775 A * | 1/1981 | Conn | | 229/71 |
| 4,288,028 A * | 9/1981 | Diaz | | 229/302 |
| 4,308,987 A * | 1/1982 | Solomon | | 229/302 |
| 4,332,346 A * | 6/1982 | Kronman | | 229/302 |
| 4,354,631 A * | 10/1982 | Stevenson | | 229/71 |
| 4,379,573 A * | 4/1983 | Lomeli et al. | | 428/42.3 |
| 4,382,539 A * | 5/1983 | Kronman | | 229/302 |
| 4,403,696 A * | 9/1983 | Newell | | 229/314 |
| 4,436,202 A * | 3/1984 | Berkley | | 206/455 |
| 4,445,635 A * | 5/1984 | Barr | | 229/302 |
| 4,487,360 A * | 12/1984 | Fisher et al. | | 229/304 |
| 4,538,833 A * | 9/1985 | Trikilis | | 281/2 |
| 4,549,658 A * | 10/1985 | Sfikas | | 206/466 |
| 4,565,317 A * | 1/1986 | Kranz | | 229/302 |
| 4,602,736 A * | 7/1986 | Barr | | 229/302 |
| 4,613,157 A * | 9/1986 | Drabish | | 283/117 |
| 4,620,630 A * | 11/1986 | Moss | | 206/45.24 |
| 4,640,030 A * | 2/1987 | Wood et al. | | 40/746 |
| 4,651,920 A * | 3/1987 | Stenner | | 229/70 |
| 4,653,639 A * | 3/1987 | Traynor | | 206/308.3 |
| 4,688,715 A * | 8/1987 | Barr | | 229/302 |
| 4,690,322 A * | 9/1987 | Burns | | 229/80 |
| 4,715,531 A * | 12/1987 | Stewart et al. | | 229/306 |
| 4,775,095 A * | 10/1988 | Emmott | | 229/303 |
| 4,778,100 A * | 10/1988 | McGuire et al. | | 229/303 |
| 4,778,101 A * | 10/1988 | Paquin | | 229/303 |
| 4,821,439 A * | 4/1989 | Wilck | | 40/638 |
| 4,896,823 A * | 1/1990 | Taylor | | 229/303 |
| 4,899,926 A * | 2/1990 | Spaulding | | 229/304 |
| 4,917,287 A * | 4/1990 | Watson | | 229/306 |
| 4,927,072 A * | 5/1990 | Jenkins et al. | | 229/92.3 |
| 4,934,536 A * | 6/1990 | Mills | | 229/69 |
| 4,944,449 A * | 7/1990 | Schmidt | | 229/301 |
| 4,945,218 A * | 7/1990 | Talbott | | 235/487 |
| 4,960,237 A * | 10/1990 | Bendel | | 229/305 |
| 4,981,251 A * | 1/1991 | Jenkins et al. | | 229/92.3 |
| 4,993,624 A * | 2/1991 | Schlich | | 229/71 |
| 5,024,374 A * | 6/1991 | Ashby | | 229/71 |
| 5,025,980 A * | 6/1991 | Blackman | | 229/302 |
| 5,039,000 A * | 8/1991 | Ashby | | 229/304 |
| 5,040,720 A * | 8/1991 | Pennock | | 229/69 |
| 5,052,613 A * | 10/1991 | Lin | | 229/303 |
| 5,071,167 A * | 12/1991 | O'Brien | | 283/79 |
| 5,071,399 A * | 12/1991 | Ashby | | 493/216 |
| 5,104,036 A * | 4/1992 | Rutkowski et al. | | 229/301 |
| 5,110,043 A * | 5/1992 | Ashby | | 229/304 |
| 5,118,030 A * | 6/1992 | McNamara et al. | | 229/69 |
| 5,118,031 A * | 6/1992 | Tighe | | 229/92.8 |
| 5,125,562 A * | 6/1992 | Bendel | | 229/69 |
| 5,163,612 A * | 11/1992 | Ashby | | 229/301 |
| 5,197,663 A * | 3/1993 | Stude | | 229/303 |
| 5,201,464 A * | 4/1993 | File | | 229/305 |
| 5,209,698 A * | 5/1993 | Dolan | | 462/17 |
| 5,213,258 A * | 5/1993 | Kim | | 229/305 |
| 5,224,647 A * | 7/1993 | Yanow | | 229/302 |
| 5,232,150 A * | 8/1993 | Solomons | | 229/302 |
| 5,248,032 A * | 9/1993 | Sheu et al. | | 206/308.1 |
| 5,253,803 A * | 10/1993 | Chess | | 229/305 |
| 5,271,553 A * | 12/1993 | Kim | | 229/303 |
| 5,277,362 A * | 1/1994 | Wilson | | 229/305 |
| 5,282,568 A * | 2/1994 | File | | 229/304 |
| 5,292,062 A * | 3/1994 | Chess | | 229/306 |
| 5,299,979 A * | 4/1994 | Ballard | | 462/18 |
| 5,318,222 A * | 6/1994 | Bartlett | | 229/72 |
| 5,324,927 A * | 6/1994 | Williams | | 235/494 |
| 5,415,341 A * | 5/1995 | Diamond | | 229/80 |
| 5,487,826 A * | 1/1996 | Back et al. | | 206/308.3 |
| 5,510,608 A * | 4/1996 | Williams | | 235/494 |
| 5,514,863 A * | 5/1996 | Williams | | 235/494 |
| 5,516,040 A * | 5/1996 | Lin | | 229/302 |
| 5,626,286 A * | 5/1997 | Petkovsek | | 229/300 |
| 5,626,370 A * | 5/1997 | Petkovsek | | 283/116 |
| 5,690,220 A * | 11/1997 | Swan | | 206/308.1 |
| 5,697,496 A * | 12/1997 | Bauer | | 206/308.1 |
| 5,722,538 A * | 3/1998 | Neely et al. | | 206/308.1 |
| 5,738,274 A * | 4/1998 | Stude | | 229/301 |
| 5,752,647 A * | 5/1998 | Schubert et al. | | 229/92.1 |
| 5,887,904 A * | 3/1999 | Petkovsek | | 283/61 |
| 5,901,843 A * | 5/1999 | Gambardella et al. | | 206/308.1 |
| 5,901,844 A * | 5/1999 | Gambardella et al. | | 206/308.1 |
| 5,909,805 A * | 6/1999 | Neely | | 206/308.1 |
| 5,967,403 A * | 10/1999 | Kranz | | 229/70 |
| 6,059,316 A * | 5/2000 | Whittington | | 281/38 |
| 6,129,269 A * | 10/2000 | Tait | | 229/301 |
| 6,179,202 B1 * | 1/2001 | Alexander et al. | | 229/92.8 |
| 6,220,504 B1 * | 4/2001 | Flynn et al. | | 229/71 |
| 6,223,977 B1 * | 5/2001 | Hill | | 229/70 |
| 6,254,138 B1 * | 7/2001 | Rawlings et al. | | 283/81 |
| 6,361,077 B1 * | 3/2002 | Petkovsek | | 283/79 |
| 6,435,404 B1 * | 8/2002 | Feick | | 229/303 |
| 6,612,484 B2 * | 9/2003 | Rawlings et al. | | 229/305 |
| 6,725,587 B2 * | 4/2004 | Collins | | 40/124.06 |
| D510,383 S * | 10/2005 | Potter et al. | | D19/3 |
| 6,966,484 B2 * | 11/2005 | Calonje et al. | | 229/305 |
| 6,983,875 B2 * | 1/2006 | Emmott | | 229/313 |
| D536,375 S * | 2/2007 | Potter et al. | | D19/3 |
| 7,178,713 B2 * | 2/2007 | Stude | | 229/313 |
| 7,201,305 B2 * | 4/2007 | Correa | | 229/69 |
| 7,469,816 B2 * | 12/2008 | Rosenkranz et al. | | 229/303 |
| 7,549,571 B2 * | 6/2009 | DeLaVergne | | 229/305 |
| 7,726,548 B2 * | 6/2010 | DeLaVergne | | 229/80 |
| 7,775,420 B2 * | 8/2010 | Emmott | | 229/305 |
| 7,815,099 B2 * | 10/2010 | DeLaVergne | | 229/301 |
| 2002/0008135 A1* | 1/2002 | Kim | | 229/303 |
| 2002/0023948 A1* | 2/2002 | Gillespie, IV | | 229/70 |
| 2002/0030093 A1* | 3/2002 | Kim | | 229/302 |
| 2002/0130169 A1* | 9/2002 | Purcell | | 229/309 |
| 2003/0015581 A1* | 1/2003 | Purcell | | 229/310 |
| 2004/0050918 A1* | 3/2004 | DeLaVergne | | 229/305 |
| 2005/0045707 A1* | 3/2005 | Stude | | 229/308 |
| 2005/0184140 A1* | 8/2005 | DeLa Vergne | | 229/301 |
| 2006/0113367 A1* | 6/2006 | Emmott | | 229/313 |
| 2006/0208053 A1* | 9/2006 | Emmott | | 229/305 |
| 2006/0219769 A1* | 10/2006 | DeLaVergne | | 229/301 |
| 2006/0266808 A1* | 11/2006 | DeLaVergne | | 229/72 |
| 2009/0302099 A1* | 12/2009 | DeLa Vergne | | 229/305 |

* cited by examiner

US 9,878,824 B1

REUSABLE ENVELOPES

CROSS-REFERENCE TO RELATED APPLICATION

The present application claims priority to U.S. Provisional Application No. 60/838,733, filed Aug. 18, 2006, the entire contents of which are incorporated herein by reference.

TECHNICAL FIELD

The present invention is directed to reusable envelope structures and methods of use thereof.

BACKGROUND

Many types of envelope structures are, in general, well known. A common disadvantage of many envelope structures is that they can only be used once and are then usually discarded afterwards, thereby creating unnecessary waste after a single use. Some envelopes fail to be used even once before being discarded. Moreover, it is common for an otherwise unused envelope structure to be discarded because it has been preaddressed for a particular recipient. For example, certain envelope structures are frequently utilized for mailing invoices and the like. A second envelope, which is often preaddressed and sometimes provided with postage, is usually included with the invoice for returning the invoice to the sender. In the case where the invoice is not returned, such as where a payment or correspondence is made electronically, the second preaddressed envelope is usually discarded. This practice, although not uncommon, is unfortunately wasteful, especially in large volumes. Thus, easily reusable envelope structures are desirable.

Envelopes have been developed that utilize a single structure to form primary and return envelopes such as are described in U.S. Pat. No. 4,194,631 to Rangan and U.S. Pat. No. 4,715,531 to Stewart et al. These envelopes are directed to small envelopes such as conventional No. 10 envelopes. Envelopes of this type are convertible from a primary to a return envelope. That is, tearing and folding steps are used to convert a received envelope to an envelope that can be returned to the sender or forwarded to another party. Typically, these structures are quite complex and somewhat costly to produce. Thus, reusable envelopes in general have been limited to small envelopes and large established markets for their use.

Additionally, known reusable envelope structures can be somewhat difficult to utilize because of a requirement for performing complex operations in order to manipulate the envelope. That is, a cumbersome sequence of steps must be followed in order to convert the envelope. Moreover, many envelopes of this type commonly include tags, glue patches, or loose edges being left on the envelope, which can interfere with machine remittance equipment, especially on the return trip. As such, easy to use and cost effective reusable envelope structures are desirable.

The POSTNET (POSTal Numeric Encoding Technique) barcode is preferably used to help ensure accurate delivery of a reusable envelope on its first use. Preferably, the POSTNET barcode is marked on the contents or correspondence to be sent. The correspondence is preferably placed in a reusable envelope, so that the POSTNET barcode is viewable through a window or the like of the envelope such as an address window. In this manner, the POSTNET barcode can help to ensure that the contents are accurately delivered to the correct address.

The POSTNET barcode was developed by the Postal Service to encode ZIP Code information on letter mail for rapid and reliable sorting by a barcode sorter (BCS). The POSTNET barcode can represent a five-digit ZIP code (32 bars), nine-digit ZIP+4 code (52 bars), or an eleven-digit delivery point code (62 bars). The delivery point (formed by the last 10 bars) represents two additional digits normally the last two digits of the street address, post office box, rural route, or highway contract route number.

The delivery point barcode was developed by the Postal Service to identify each of the 134 million delivery points in the United States. The POSTNET delivery point barcode system significantly reduces the time it takes the post office to sort letter mail before delivery.

The post office uses two methods of operations to process mail: manual and automated. Manual requires the address be read and sorted manually while automated requires the mail be fed into and removed from a machine that both reads and sorts. There are two types of automated systems: multiline optical character readers (MLOCR) and barcode sorters (BCS). A MLOCR scans the address block on each letter size mailpiece to determine the ZIP+4 code and the delivery point information. The MLOCR then converts this information to a POSTNET barcode. The MLOCR then prints the barcode on the envelope and performs the initial sorting.

A barcode sorter (BCS) reads POSTNET barcodes on letter-size pieces and sorts the mail accordingly. This machine does not read addresses, so it will missort a piece if an incorrect barcode is present. If a POSTNET barcode was not part of the address block showing through the window, the MLOCR would read the address and print a POSTNET barcode on the envelope in the barcode clear zone located at the bottom right of the envelope.

Having the POSTNET barcode provided on the envelope (such as by printing, for example) is generally not preferred on a reusable envelope. If there is no barcode on the envelope when it arrives at the post office, the letter will go through the MLOCR and print a POSTNET barcode for delivery on the envelope so the BCS can sort the mail. The barcode will typically be printed on the lower right side of the envelope in the barcode clear zone. If the barcode is printed on the reusable envelope when a reusable envelope is sent the second time with a new address, the mailpiece will skip the MLOCR and go directly to the original BCS. Although there is a new address, the BCS will only read the old barcode that was printed on the envelope. In this situation the POSTNET barcode printed on the envelope corresponds to the address of the original mailing, not the address of the second mailing. Thus, the BCS will read the original barcode from the original address and sort the mail to go to the original location not to the new address because the POSTNET barcode printed on the envelope was created using the original address and has priority over the new address.

As an example, if a mailing and billing entity such as a utility company did not have a POSTNET barcode with the customer's address on the statement and viewable through a window of the envelope, the address would be read by the MLOCR and a POSTNET barcode would be printed on the envelop to enable the BCS to sort the mail. This would be acceptable for the delivery but if the same envelope were used to send payment back to the utility company with the company's address now in the window (for example the statement from the utility company could be put back in the envelope so the utility company's address was visible through a window), the company's address would not be read and assigned a POSTNET barcode, only the barcode which was printed on the envelope corresponding to the customer's address would be read. Having the POSTNET appear with the address block of the contents of the envelope can eliminate having the mailpiece to go through the MLOCR, which would print a POSTNET barcode on the envelope thus preventing the envelope from being effectively reused. Having a POSTNET barcode that is preprinted for the address in the address block will be read by the BCS then sorted for the correct address location. The POSTNET barcode in the address block will therefore be the correct barcode for that address. Therefore, having the POSTNET barcode preprinted with the address can help guarantee correct delivery when the envelope is resent. Having the POSTNET barcode in the address block and not printed on the envelope can eliminate the need to print a POSTNET barcode on the envelope, thereby preventing the mail being sorted to the wrong location. With a POSTNET barcode with the address, the whole MLOCR process can be skipped and the mailpiece can go directly to the BCS for sorting. This can save time and labor costs for the post office. This savings can then be passed on in the form of rate discounts and faster delivery of the mail.

SUMMARY

The present invention provides reusable envelope structures and methods of use thereof. In preferred aspects, the present invention provides novel envelope structures in which a single envelope structure can provide multiple uses. With a POSTNET barcode in the address block of the contents of the envelope, no barcode needs to be printed on the envelope itself. For the purpose of using the reusable envelope of invention, having a barcode printed on the envelope could prevent the post office from delivering the mail back to the sender (such as the utility company described above) because the barcode could contain the customers ZIP+4 code and would be sorted to go back to the customer instead of to the utility company, for example. Additional benefits of providing a barcode in the address block that can show through a window before it arrives at the Post Office allows for automation-compatible rate discounts. Thus a POSTNET barcode in the address block of the contents may be desirable by both the post office and most businesses that send letter-size mail.

In an aspect of the present invention a reusable envelope is provided. The reusable envelope preferably comprises a reusable envelope body and a reusable closure flap. The reusable sealing flap preferably comprises a first portion proximal to the reusable envelope body, a second portion extending from the first portion, a third portion extending from the second portion, at least one bridge portion partially connecting the second and third portions, and a tear strip. The first portion is proximal to the reusable envelope body and extends along the reusable envelope body for a length. The first portion comprises a first adhesive region and is at least partially defined by a fold line connecting the reusable closure flap to the reusable envelope body and a first line of weakness spaced apart from the fold line. The second portion extends from the first portion and is distal from the reusable envelope body and preferably extends along the length of the first portion. The second portion is at least partially defined by the first line of weakness and a second line of weakness spaced apart from the first line of weakness wherein the second line of weakness extends partially across the reusable closure flap. The third portion extends from the second portion and is distal from the reusable envelope body and preferably extends along a length of the second portion that is less than the length of the second portion. The third portion comprising a second adhesive region and is at least partially defined by the second line of weakness and a distal edge of the reusable sealing flap. The tear strip is preferably defined at least partially by the first and second lines of weakness. The reusable envelope body preferably comprises a front panel, rear panel, top edge, bottom edge, right edge, and left edge. In accordance with the present invention, the reusable closure flap preferably extends from the bottom edge of the reusable envelope body.

In another aspect of the present invention, a method for reusing an envelope is provided. The method comprises the steps of providing an envelope such as the reusable envelope described above, attaching the third portion of the reusable sealing flap to the reusable envelope body to close the reusable envelope a first time, removing the tear strip, separating the second portion of the reusable sealing flap from the third portion of the reusable sealing flap by tearing the at least one bridge portion, and attaching the first portion of the reusable sealing flap to the reusable envelope body to close the reusable envelope a second time. The method may also comprise the step of attaching the first portion of the reusable sealing flap to the reusable envelope body to close the reusable envelope a second time comprising folding the first portion of the reusable sealing flap along the fold line and attaching the first portion of the reusable sealing flap to the rear panel of the reusable envelope body.

In another aspect of the present invention, a reusable envelope is provided. The reusable envelope preferably comprises a reusable envelope body and a reusable sealing flap, the reusable sealing flap comprises a first portion proximal to the reusable envelope body, a second portion extending from the first portion, a third portion, and at least one bridge portion partially connecting the second and third portions of the reusable sealing flap. The first portion is proximal to the reusable envelope body and extends along the reusable envelope body for a length. The first portion comprises a first adhesive region and is at least partially defined by a fold line connecting the reusable closure flap to the reusable envelope body and a first line of weakness spaced apart from the fold line. The second portion extends from the first portion and is distal from the reusable envelope body and preferably extends along the length of the first portion. The second portion is preferably at least partially defined by the first line of weakness and a tear strip spaced apart from the first line of weakness wherein the tear strip extends partially across the reusable closure flap. The third portion extends from the tear strip and is distal from the reusable envelope body and extends along a length of the tear strip that is less than the length of the first portion. The third portion comprises a second adhesive region and is preferably at least partially defined by the tear strip and a distal edge of the reusable closure flap. The reusable envelope body preferably comprises a front panel, rear panel, top edge, bottom edge, right edge, and left edge. In accordance with the present invention, the reusable closure flap preferably extends from the bottom edge of the reusable envelope body.

In another aspect of the present invention a method is provided for preventing a reusable envelope mailed a first time by a first sender to a second sender from looping back to the second sender when the reusable envelop is mailed a second time by the second sender. The method comprises the steps of receiving a reusable envelope having a reusable closure flap and that has been mailed a first time by the first sender to a first destination address, and applying a mark such as a barcode, for example, that comprises information related to the first destination address on a removable portion of the reusable closure flap that is removed when the reusable envelope is opened a first time thereby also removing the mark prior to reusing the envelope a second time.

In another aspect of the present invention a method is provided for preventing a reusable envelope mailed a first time by a first sender to a second sender from looping back to the second sender when the reusable envelope is mailed a second time by the second sender. The method comprises the steps of receiving a reusable envelope having a reusable envelope body and a reusable closure flap and that has been mailed a first time by the first sender to a first destination address, and applying a mark such as a barcode, for example, that comprises information related to the first destination address at a first position on a portion of the reusable envelope that become a closure flap after the reusable envelope is opened a first time and that can be folded over the reusable envelope body to close the reusable envelope when the reusable envelope is used a second time thereby positioning the mark at second position on a portion of the reusable envelope that is different from the first position.

It is believed that any envelope, mailing device, or mailing container can benefit from the application of the inventive concept of the present invention. As a result, the choice of the type of envelope in which to apply the concept is not particularly limited. It is believed, however, that certain aspects of the inventive concept will prove particularly advantageous to send and return mail envelopes. Accordingly, envelopes can easily be manufactured to be reused. Moreover, this helps to reduce landfill waste and save natural resources.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this application, illustrate several aspects of the invention and together with the description of the embodiments serve to explain the principles of the invention. A brief description of the drawings is as follows.

DETAILED DESCRIPTION

Figure 1:
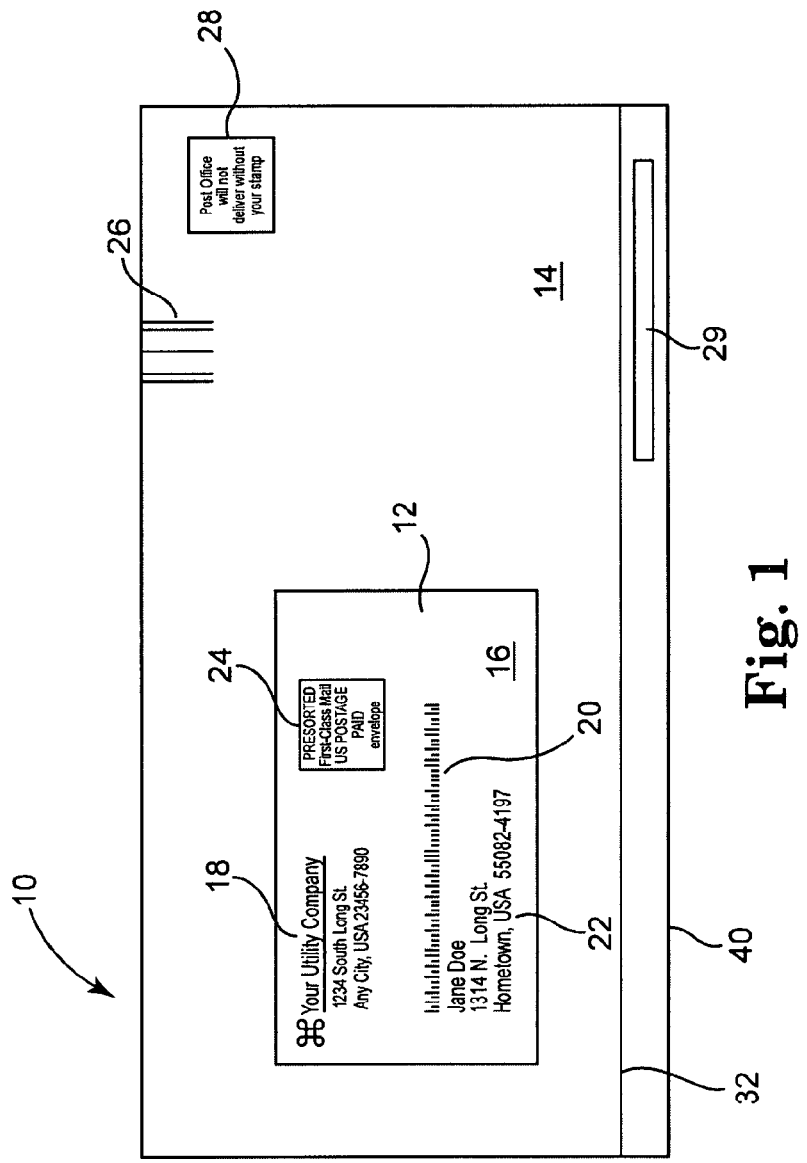
FIG. 1 is a front view of an exemplary reusable envelope in accordance with the present invention and in a closed configuration ready for a first use.

An exemplary reusable envelope 10 and methods of using such envelope in accordance with the present invention are shown in FIGS. 1-9. FIG. 1 shows a front view of envelope 10 in a configuration for a first use in accordance with the present invention with a window 12 provided in a front panel 14 of the envelope 10. As shown, envelope 10 is a No. 10 size envelope but any size envelope can be used in accordance with the present invention. An inserted form 16 such as a statement for a bill with the return address of the originator 18, a POSTNET barcode 20, address of a customer 22 (or first receiver) for a first use of the envelope 10, and postage indicia 24 for payment of outgoing delivery (for first use) are visible through the window 12 of the envelope 10. In the upper right corner on the front panel 14 of the envelope 10 is a Facing Identification Mark 26 (FIM A) used to identify mail with return postage and optional indicia 28 for placement of a postage mark for a second use of the envelope 10 in accordance with the present invention. Envelope 10 also illustrates a barcode 29 (typically POSTNET) that is optionally used by the Post Office positioned on the lower right of the front panel 14 below fold line 32. All of these features are accepted by the United States Postal Service (USPS) as detailed in the Domestic Mail Manual (DMM) Section 604.5.3.4 and specifically No. 25 entitled, "Designing Letter and Reply Mail" and also in Postal Bulletin February 2007 allowing a FIM on outgoing mail.

Figure 2:
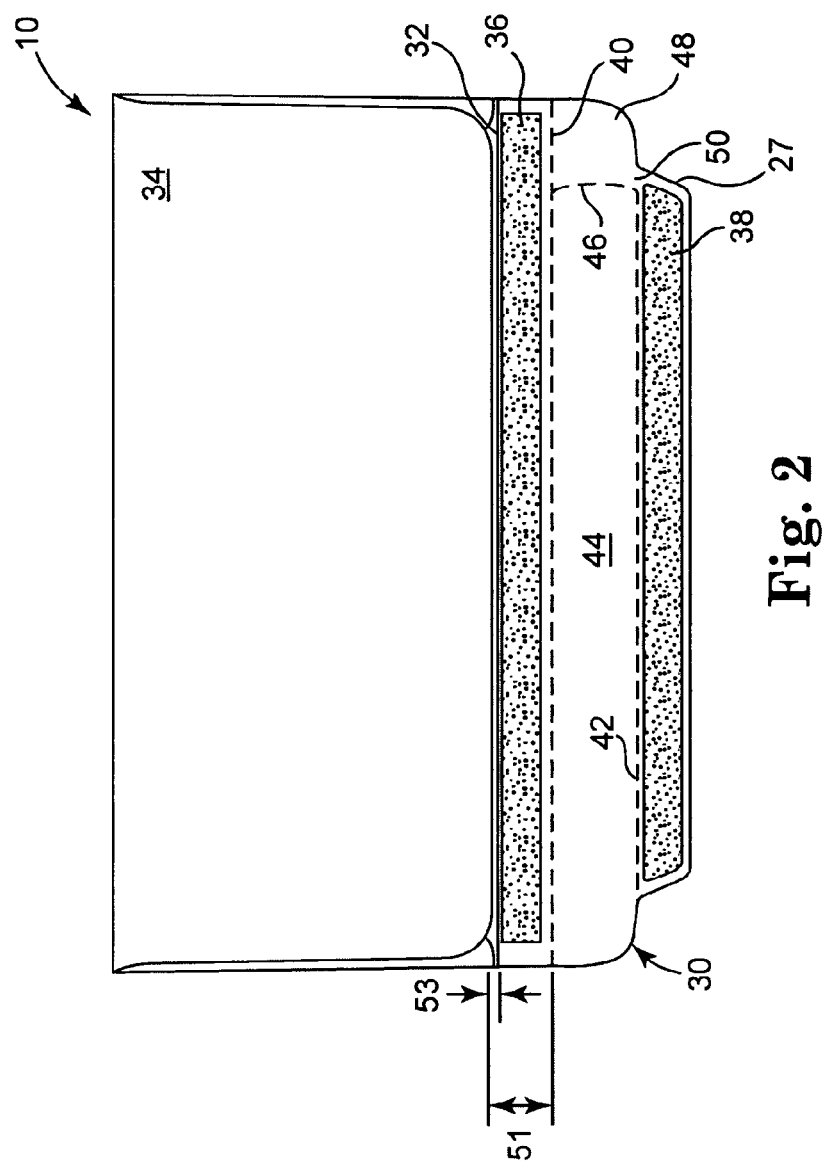
FIG. 2 is a rear view of the reusable envelope of FIG. 1 showing a reusable closure flap at the bottom of the reusable envelope in an open configuration before a first use.

FIG. 2 shows a rear view of the envelope 10 in an open configuration before being sealed a first time for a first use as shown in FIG. 1. In accordance with the present invention closure flap 30 extends from the front panel 14 along a fold line 32 of the envelope 10 and can be sealed to a rear panel 34 to close the envelope 10. The closure flap 30 preferably includes a first adhesive region 36 for sealing the envelope a first time and a second adhesive region 38 for sealing the envelope a second time upon reuse of the envelope 10. Closure flap 30 also includes first and second lines of weakness, 40 and 42, respectively. The first and second lines of weakness, 40 and 42, (such as a perforation, for example) define a tear strip 44 that functions to open the envelope a first time. The tear strip includes an end 46 spaced from an edge 48 of the envelope to define a bridge portion 50. The envelope 10 thus has a first throat defined by the distance identified by reference numeral 51 for the first use and a second throat defined by the distance identified by reference numeral 53 for the second use.

The end 46 of the tear off strip 44 preferably comprises a die cut preferably extending the width of the tear strip 44 for grasping the tear strip 44 and pulling to remove the tear strip 44. Removing the tear strip 44 partially opens the envelope 10 except for the bridge portion 50 that preferably extends from the beginning of the die cut to an edge 27 of the flap 30. In accordance with the present invention, the bridge portion 50 preferably functions as a safety device to keep the envelope 10 from accidentally tearing along the perforations while in the inserting process, for example, whereby letters or statements are mechanically inserted into the envelope 10 and sealed for mailing. As shown, the bridge portion 50 is preferably located at the intersection of the large portion of the closure flap 30 and the small portion of the closure flap 30 near the die cut. The scallop shape of the closure flap 30 near the die cut and bridge portion 50 facilitates the narrow bridge portion 50 which is designed to be strong enough to permit secure machine inserting and sealing, but small enough for a customer to easily break the bridge portion 50 when opening the envelope 10. The bridge portion also functions as a safety mechanism for the rough and tumble journey an envelope makes in the delivery carrier's bag. The illustrated envelope 10 includes one bridge portion, but plural bridge portions can be used. For example, envelope 10 could include a second bridge portion opposite the bridge portion 50 on the opposite side of closure flap 30. Such bridges or non-perforated regions also help to prevent premature tearing of the closure flap 30 from the body of the envelope 10 during inserting and delivery.

Figure 3:
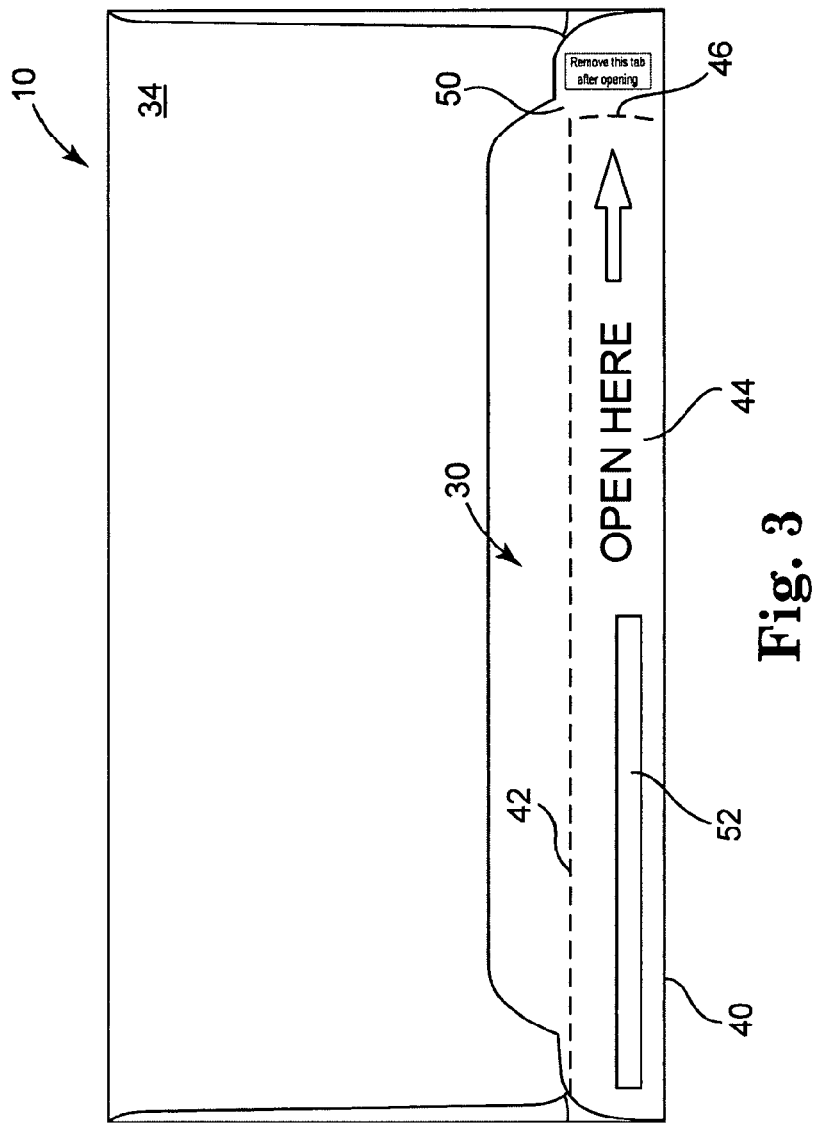
FIG. 3 is a rear view of the reusable envelope of FIGS. 1 and 2 showing the reusable closure flap in a closed configuration during a first use of the envelope and also schematically showing an identification tag that is optionally positioned on the envelope by the Post Office during use.

FIG. 3 shows envelope 10 closed for a first use with the closure flap 30 folded along line of weakness 40 which then forms an envelope bottom edge, and attached to the rear panel 34 of the envelope 10. Also shown on the closure flap 30 is a schematic representation of a fluorescent ID barcode 52 and the location the Post Office positions such mark on the envelope. While processing the mail for delivery the Post Office may apply a mark or barcode or the like (typically an orange fluorescent barcode) on the back lower left of the envelope. This mark is typically applied by the Post Office when there is a problem processing the mail piece normally, including reading the address to deliver the mail piece. When a problem such as mentioned occurs, the Post Office will take a picture of the address and place such a mark for the address on the back enabling the mail to be sorted to the correct delivery route for delivery.

The barcode 52 is typically only provided on envelopes when the address is not clearly readable or the envelopes are out of their presorted order or do not have a POSTNET barcode address in the window. The barcode 52, if used, needs to be removed so the envelope will not loop back to the customer or first user of the envelope when mailed a second time. The barcode 52 is an internal Post Office step to keep mail from being delayed for any reason. Because envelopes in accordance with the present invention can be used by statement mailers, the barcode 52, when present, must be obscured or removed to prevent looping during a second use of the envelope.

Figure 4:
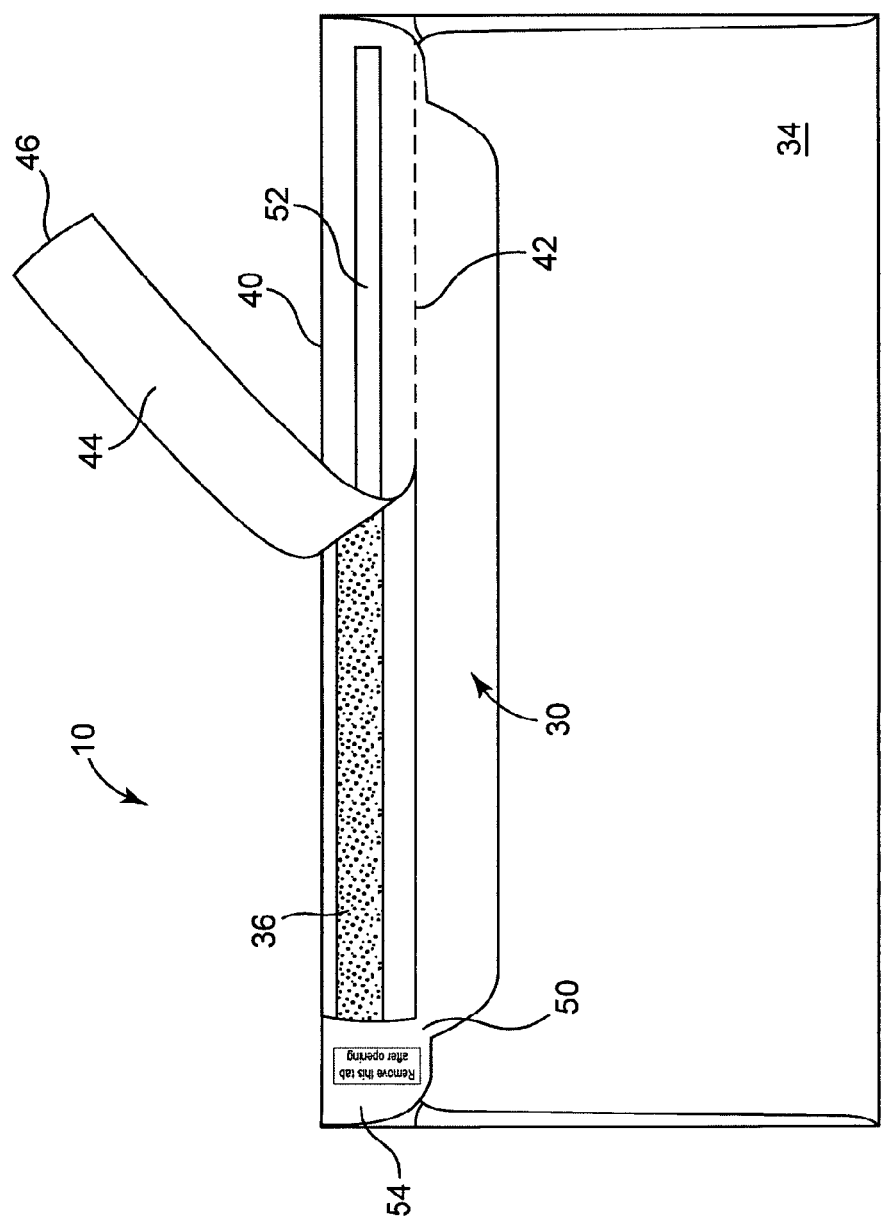
FIG. 4 is a rear view of the reusable envelope of FIG. 3 showing removal of a tear strip to partially open the envelope a first time and to remove the optional identification tag.
Figure 5:
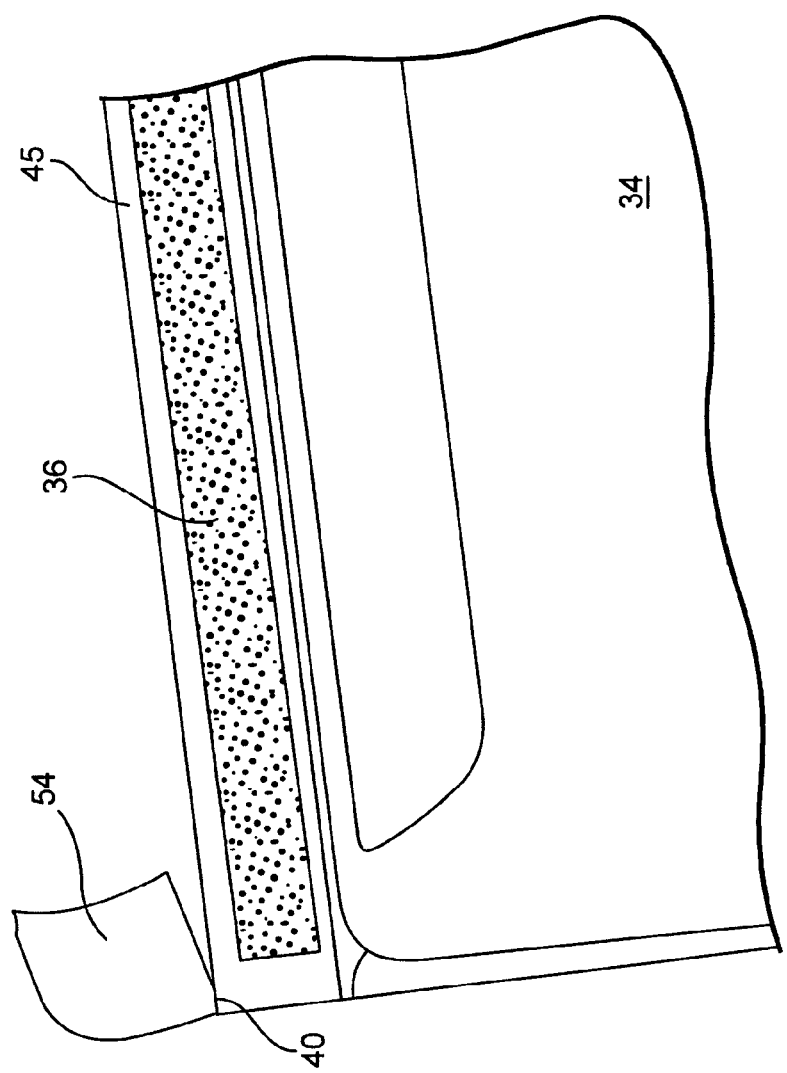
FIG. 5 is a rear view of the reusable envelope of FIG. 4 showing removal of a tab by severing a bridge portion to open the reusable envelope after a first use.

FIG. 4 shows a method of removing the barcode 52 when opening the envelope 10 by removing tear strip 44 along perforations 40 and 42. After the tear strip 44 is removed, the bridge portion 50 is severed and tab 54 is separated from the closure flap 30 as shown in FIG. 5. Solving this problem is a unique solution to preventing mail from looping using a reusable envelope, and at least partially relies on providing a reusable closure flap on the bottom of the envelope in accordance with the present invention. That is, the present invention positions a removable portion of the sealing flap where the barcode that needs to be removed is positioned. Sealing flaps of the present invention thus function to both open the envelope and remove the problem barcode. This simple method of removing the barcode also eliminates the need for extra flaps and folds complicating the envelope.

In accordance with the present invention, removing the tear strip 44 opens the envelope 10 along perforation 40 that becomes the edge of a new closure flap 45, visible in FIG. 5, for sending the envelope 10 a second time. By having a perforation along the edge of the envelope 10 as illustrated, the use of a tool to open the envelope 10 such as a knife, letter opener, or automated machine does not destroy the ability of the envelope 10 to be resealed because the tool will cut along the perforated edge 40. The perforation 40 also functions as the fold line for the closure flap 30 to easily close the envelope 10 for the original mailing.

Figure 6:
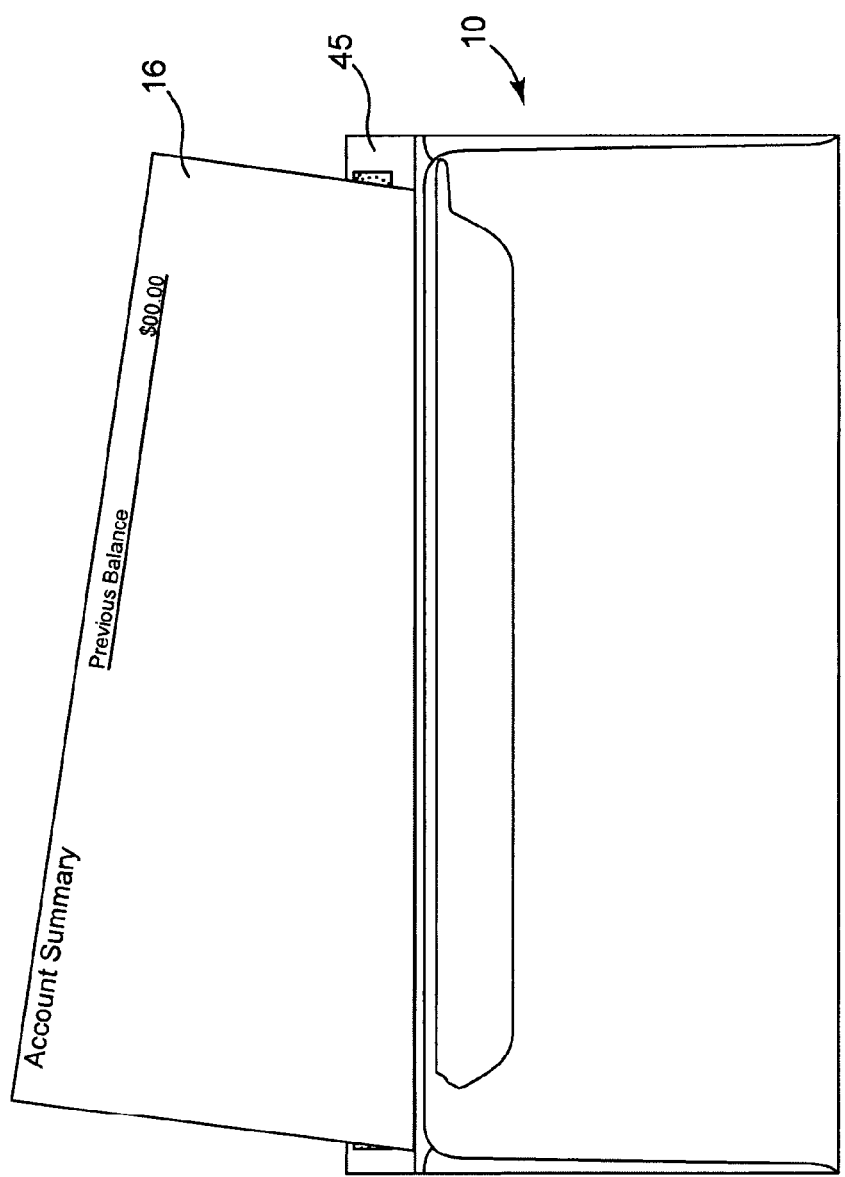
FIG. 6 is a rear view of the reusable envelope of FIG. 5 showing removal of the contents of the reusable envelope during a first use of the reusable envelope.
Figure 7:
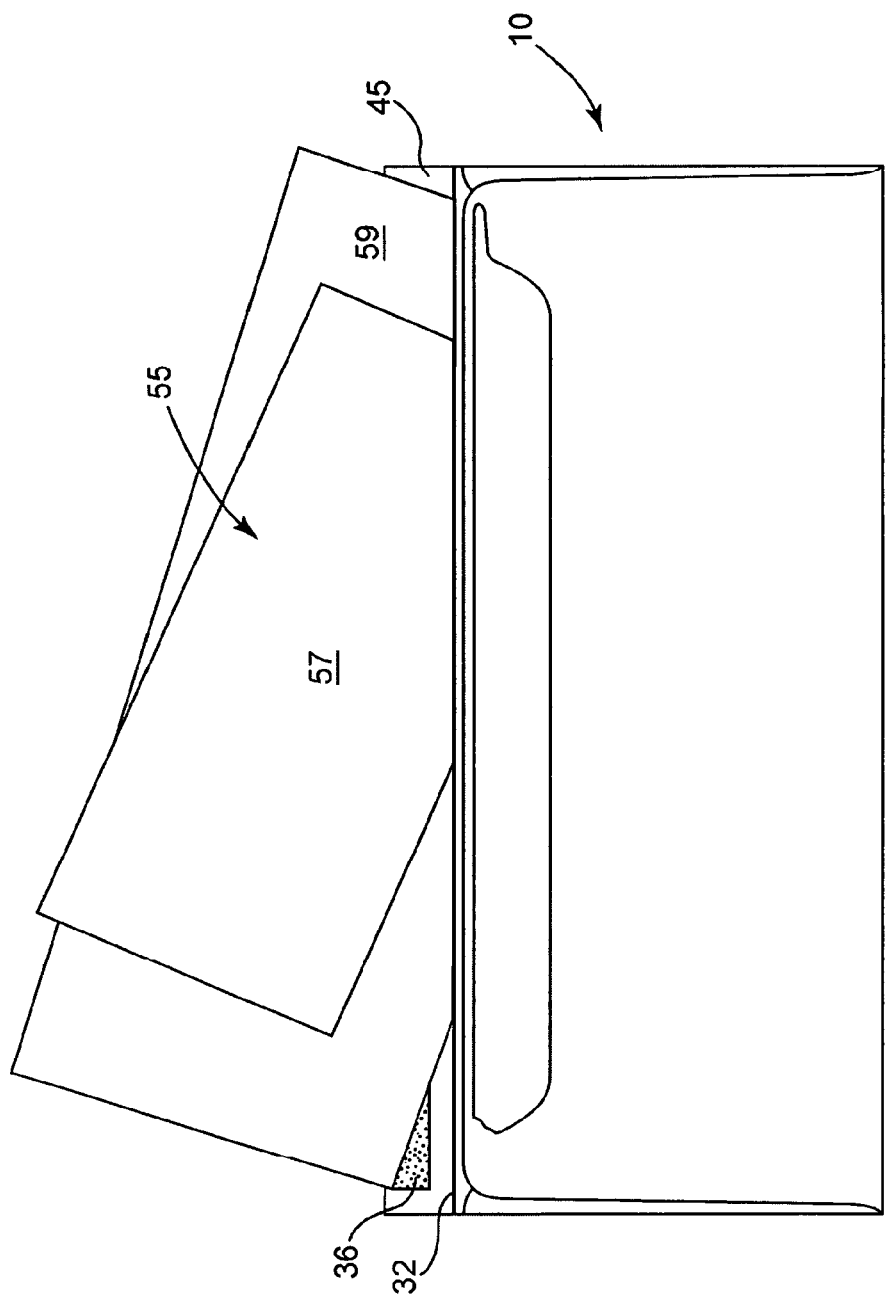
FIG. 7 is a rear view of the reusable envelope of FIG. 6 showing new contents being inserted into the reusable envelope for a second use of the reusable envelope.
Figure 8:
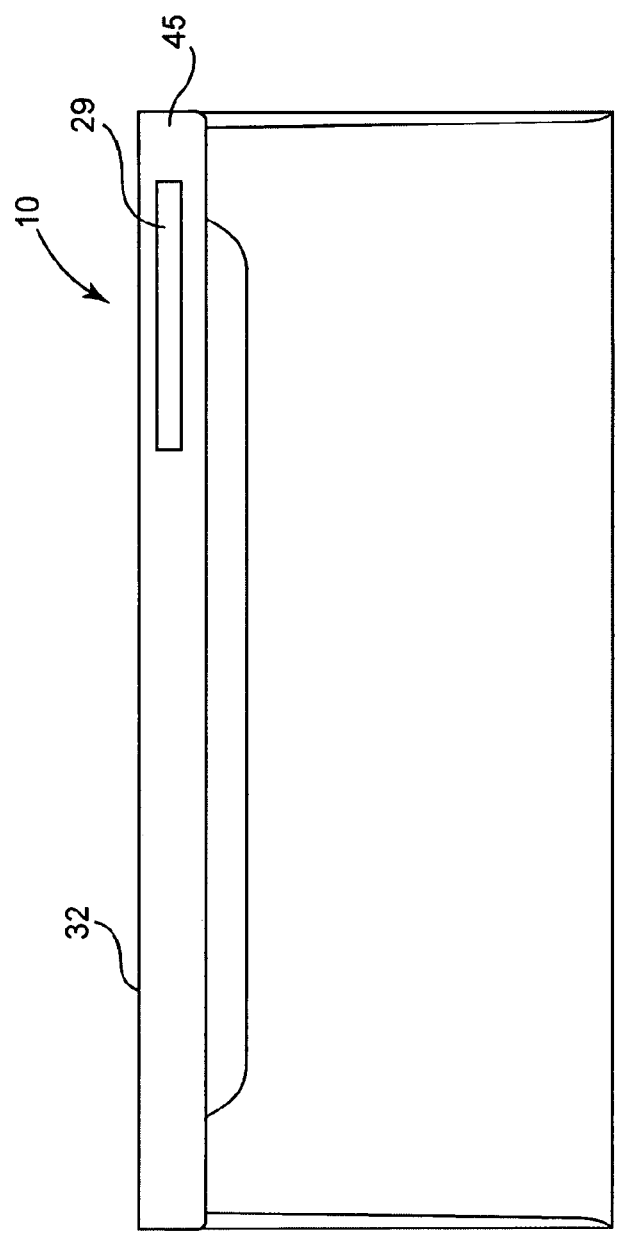
FIG. 8 is a rear view of the reusable envelope of FIG. 7 showing the reusable envelope closed for a second use.
Figure 9:
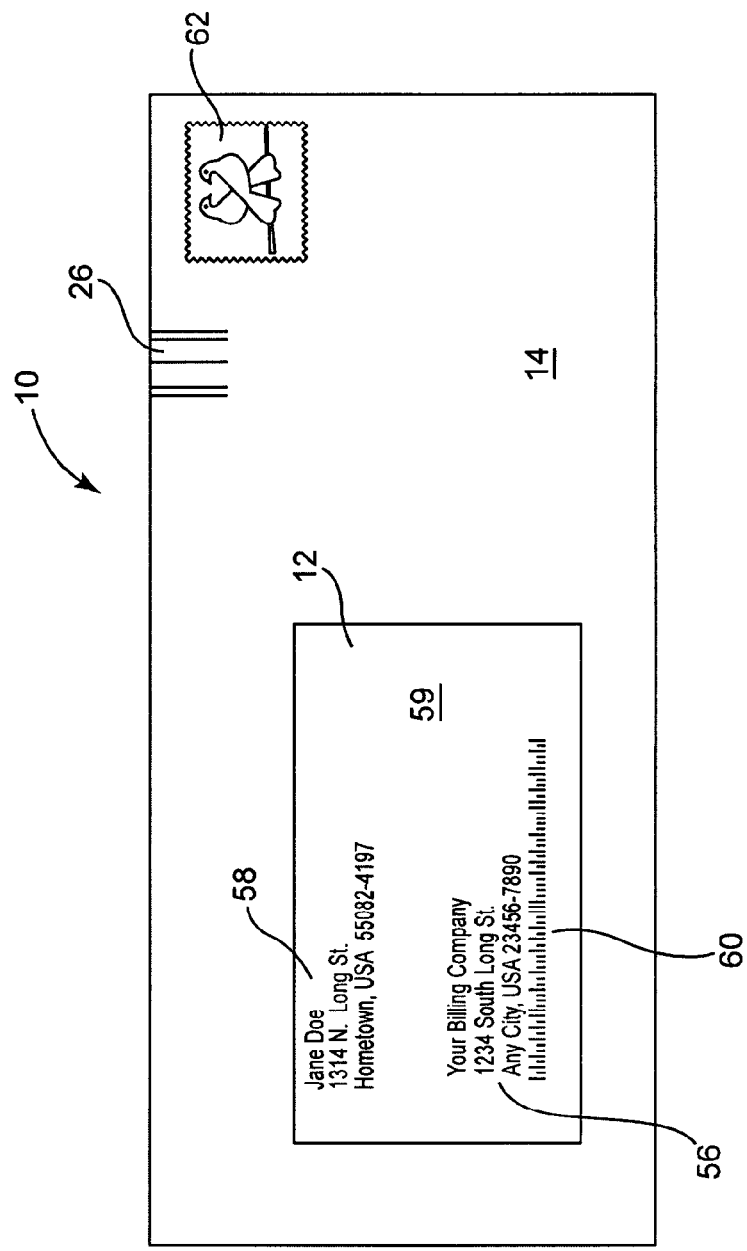
FIG. 9 is a front view of the reusable envelope of FIG. 8.

FIG. 6 shows the inserted statement 16 or other correspondence being removed after opening the envelope 10 the first time. FIG. 7 shows correspondence 55 to be sent in the envelope 10 a second time and as shown includes a check 57 and return portion 59 of a statement. FIG. 8 shows the closure flap 45 folded over to close the envelope 10 for the second used. The second trip closure flap 45 preferably seals on the top of the remaining portion of the first closure flap 30 that is attached to the envelope 10. This can help to cover any loose flap portions that could interfere with mail processing equipment, for example. Also, if present, POSTNET barcode 29 is now positioned on the back of the envelope out of the read zone for such marks and is accordingly obscured. FIG. 9 shows the envelope 10 ready to be sent a second time and with a destination address 56 in the window 12, a return address 58, a POSTNET barcode address 60, and a postage stamp 62 placed in the upper right corner of the envelope 10 for payment of return postage.

Figure 10:
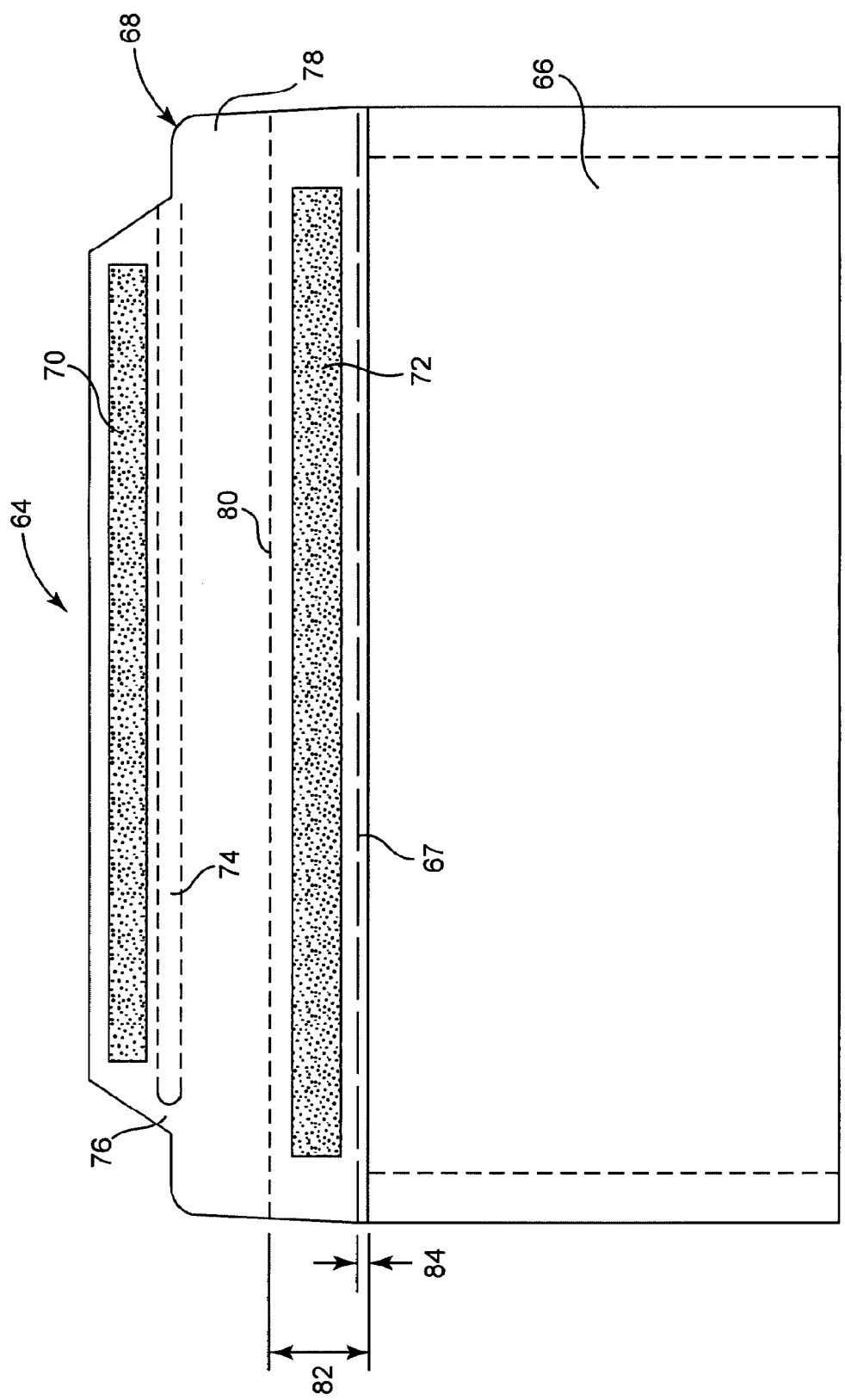
FIG. 10 is a rear view of another exemplary reusable envelope in accordance with the present invention shown in an open configuration for a first use of the reusable envelope.
Figure 11:
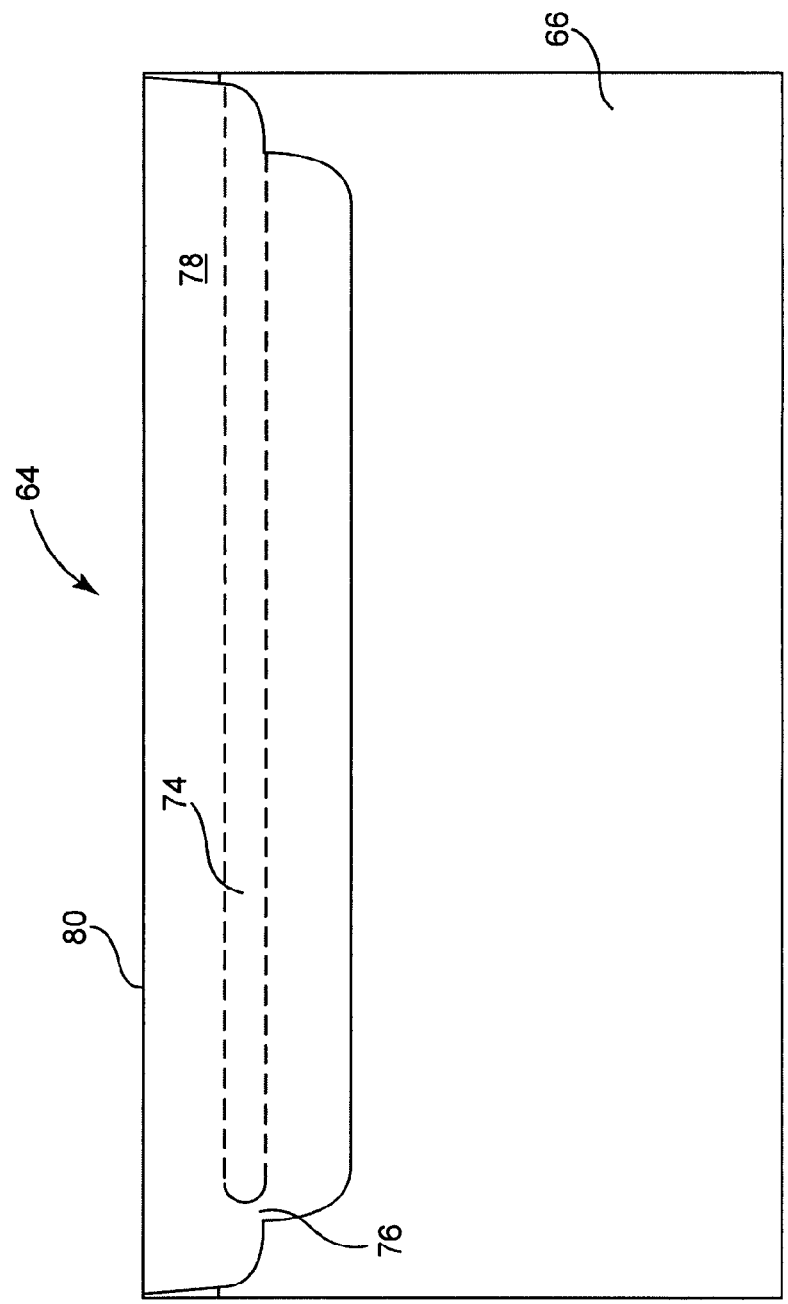
FIG. 11 is a rear view of the reusable envelope of FIG. 10 shown in a closed configuration for a first use of the reusable envelope.
Figure 12:
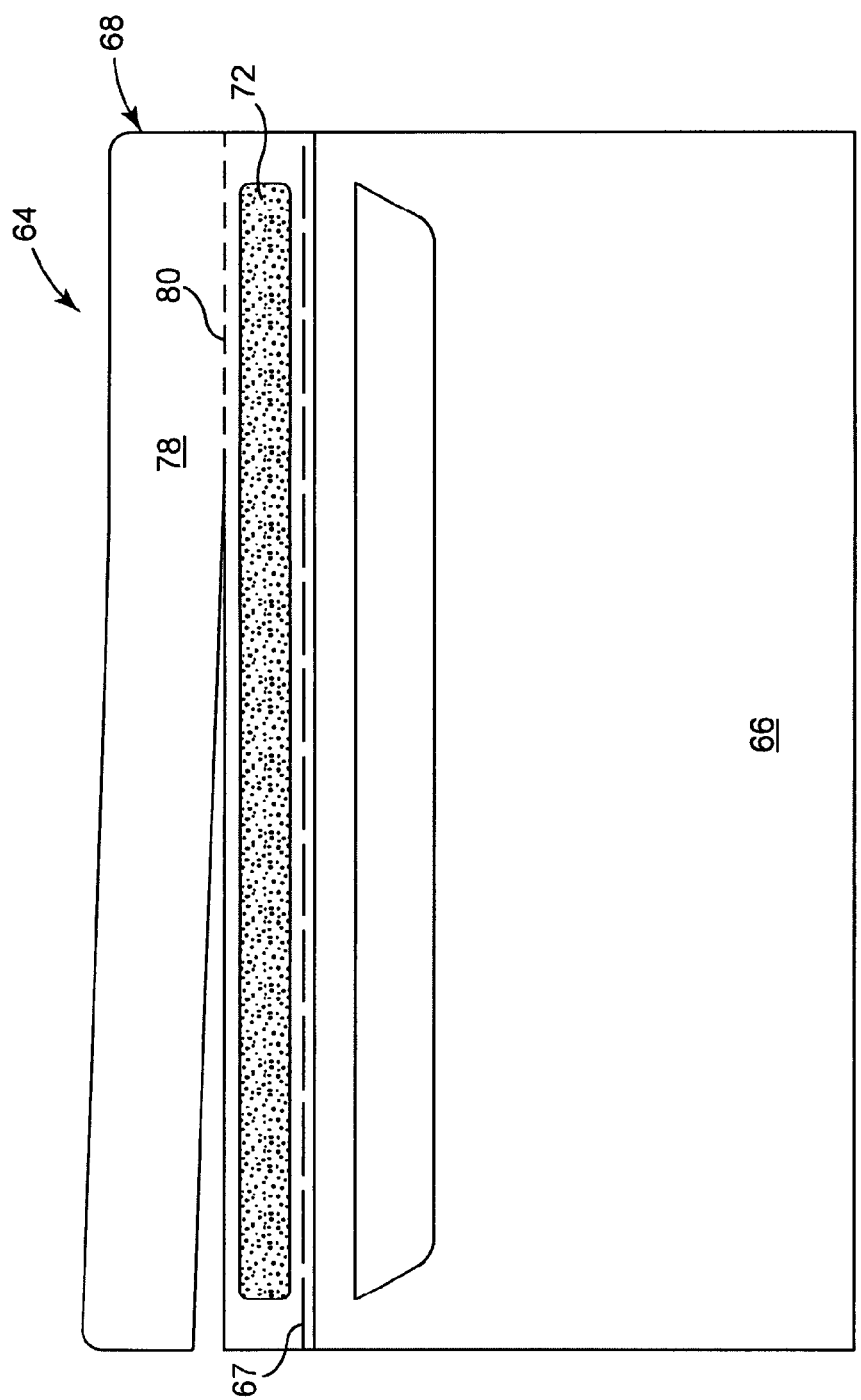
FIG. 12 is a rear view of the reusable envelope of FIG. 11 shown in a open configuration and showing removal of a portion of the reusable closure flap of the reusable envelope to prepare the reusable envelope for a second use.

FIGS. 10-12 illustrate another exemplary reusable envelope 64 in accordance with the present invention. The envelope 64 comprises an envelope body 66 and reusable closure flap 68 extending from the envelope body 66 at fold line 67. The closure flap 68 preferably extends from the top of the envelope 64 but the closure flap 68 may extend from the bottom of the envelope 64 if desired. The closure flap 68 comprises a first adhesive region 70 for closing the envelope 64 a first time and a second adhesive region 72 for closing the envelope 64 a second time for reuse. For the first use, envelope 64 is closed by folding closure flap 68 along fold line 80 which also functions as a line of weakness as described below. For the second use, envelope 64 is closed by folding closure flap 68 along fold line 67. The envelope 64 thus has a first throat defined by the distance identified by reference numeral 82 for the first use and a second throat defined by the distance identified by reference numeral 84.

In use, tear strip 74 is removed and bridge portion 76 is severed to open the envelope 64 after being closed a first time with adhesive region 70. As shown, tear strip 74 is partially defined by perforations but any tear strip, single line of weakness, plural lines of weakness, or other opening technique may be used. The bridge portion 76 is preferred by not required. Bridge portions at both sides of the closure flap 68 may be used. After opening a first time, portion 78 of closure flap 68 is also removed by line of weakness 80, such as a perforation or the like. After portion 78 is removed the envelope 64 can be closed for a second use by folding closure flap along fold line 67.

Figure 13:
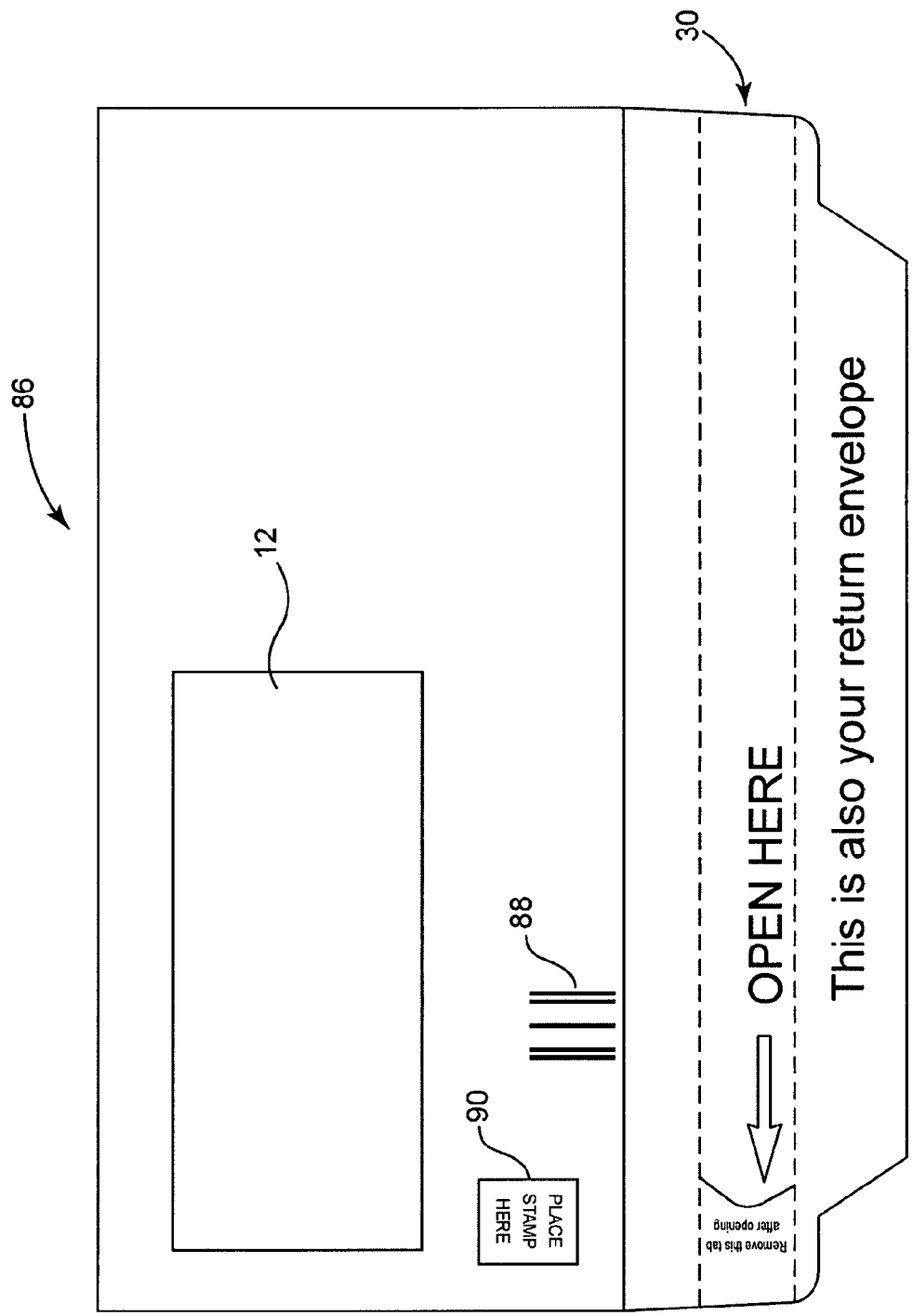
FIG. 13 is a front view of another exemplary reusable envelope in accordance with the present invention shown in an open configuration for a first use of the reusable envelope.

FIG. 13 illustrates another exemplary reusable envelope 86 in accordance with the present invention. Envelope 86 is similar to envelope 10 described above and preferably includes the same closure flap 30. Envelope 86 differs from envelope 10 in that envelope 86 includes a Facing Identification Mark 88 (FIM A) used to identify mail with return postage and an optional indicia 90 for placement of a postage mark such as a stamp, for example, for a second use of the envelope 86 in accordance with the present invention.

Design advantages provided by reusable envelope in accordance with the present invention include no extra folds or flaps, ease of use and reuse, conventional and familiar ways to open, remove contents, reinsert reply, reseal, apply postage and mail. Reusable envelopes in accordance with the present invention are capable of eliminating looping issues by removing, or obscuring any barcodes provided on the envelope front or back without adding additional flaps or folds to accomplish the task. If a barcode is applied on the front lower right corner of the envelope then when the envelope is resealed that portion of the face that the barcode is positioned on is the back lower right corner on the return trip. This removes this barcode from the read zone (⅝"×4" from the lower right edge of the envelope on face) thus making it non readable. Also, having a perforation along the fold edge of the closure flap of an envelope helps to eliminate the risk of someone opening the envelope with a letter opener of any kind and ruining the reuse capabilities.

Reusable envelope structures, sealing flap structures, and methods of using such reusable envelopes are disclosed in copending U.S. patent application Ser. No. 11/064,791 to DeLaVergne filed on Feb. 24, 2005, the entire disclosure of which is incorporated herein by reference for all purposes. In particular, sealing flap structures and methods of use described in the Ser. No. 11/064,791 application can be used with the reusable envelopes of the present invention.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method for reusing an envelope, the method comprising the steps of:
prov020iding within said reusable envelope a reusable envelope body and a reusable sealing flap, said reusable sealing flap having
a first flap portion proximal to said reusable envelope body and extending along said reusable envelope body for a length, said first flap portion comprising a first adhesive region and at least partially defined by a first fold line connecting said reusable sealing flap to said reusable envelope body and a first line of weakness spaced apart from said first fold line;
a second fold line more distal from said reusable envelope body than said first flap portion;
a second flap portion extending from said first flap portion and more distal from said reusable envelope body and having a length extending generally along a length of said first flap portion that is less than said length of the first flap portion, said second flap portion comprising a second adhesive region extending substantially across said length of said second flap portion, said second adhesive region comprising a first end adjacent a first side edge of said reusable sealing flap and a second end adjacent a second side edge of said reusable sealing flap said second flap portion at least partially defined by said first line of weakness and a distal edge of said reusable sealing flap;
folding said second fold line and responsive thereto, moving said second flap portion of said reusable sealing flap towards said reusable envelope body;
attaching said second adhesive region to the reusable envelope body to close the reusable envelope a first time;
separating said first portion of the reusable sealing flap from said second portion of the reusable sealing flap along said first line of weakness while leaving said second portion of said reusable sealing flap adhered to said reusable envelope body; and
folding said first fold line and responsive thereto, moving said first flap portion of said reusable sealing flap over said second flap portion attached to said reusable envelope body;
attaching said first adhesive region to the reusable envelope body adjacent to said second adhesive region first end, to said second flap portion, and to said reusable envelope body adjacent to said second adhesive region second end to close the reusable envelope a second time and to at least partially cover said second flap portion.

2. The method of claim 1, wherein the reusable envelope body comprises a front panel, rear panel, top edge, bottom edge, right edge, left edge and wherein the reusable sealing flap extends from the bottom edge.

3. The method of claim 2, wherein the step of attaching first portion of the reusable sealing flap to the reusable envelope body to close the reusable envelope a second time comprises folding the first portion of the reusable sealing flap along the first fold line and attaching the first portion of the reusable sealing flap to the rear panel of the reusable envelope body.

4. The method of claim 1, wherein said step of separating said first portion of said reusable sealing flap from said second portion of said reusable sealing flap along said first line of weakness further comprises the step of removing a tear strip from a location between said first flap portion and said second flap portion.

5. The method of claim 1, wherein said step of separating said first portion of said reusable sealing flap from said second portion of said reusable sealing flap further comprises the steps of:
dividing said first portion of said reusable sealing flap from said second portion of said reusable sealing flap substantially entirely along said first line of weakness, while leaving said first portion of said reusable sealing flap attached to said second portion of said reusable sealing flap adjacent thereto in a bridge region stronger than said first line of weakness; and
severing said bridge region subsequent to said dividing step to thereby fully separate said first portion of said reusable sealing flap from said second portion of said reusable sealing flap.

\* \* \* \* \*